United States Patent
Mantese

(10) Patent No.: US 7,800,048 B2
(45) Date of Patent: Sep. 21, 2010

(54) SYSTEM AND METHOD FOR DETERMINING A CHANGE OF TEMPERATURE OF A SBT PIXEL ELEMENT

(75) Inventor: Joseph V. Mantese, Manchester, CT (US)

(73) Assignee: Delphi Technologies, Inc., Troy, MI (US)

( * ) Notice: Subject to any disclaimer, the term of this patent is extended or adjusted under 35 U.S.C. 154(b) by 518 days.

(21) Appl. No.: 11/758,776

(22) Filed: Jun. 6, 2007

(65) Prior Publication Data

US 2008/0089388 A1 Apr. 17, 2008

Related U.S. Application Data

(60) Provisional application No. 60/851,691, filed on Oct. 13, 2006.

(51) Int. Cl.
*H01J 7/24* (2006.01)
*G01J 1/44* (2006.01)
*H01L 37/00* (2006.01)

(52) U.S. Cl. .............. 250/238; 250/214 R; 250/338.2

(58) Field of Classification Search ............ 250/214 R, 250/238, 338.2, 208.1, 338.3; 374/163, 176, 374/177
See application file for complete search history.

(56) References Cited

U.S. PATENT DOCUMENTS

| | | | |
|---|---|---|---|
| 5,559,332 A * | 9/1996 | Meissner et al. | 250/338.2 |
| 7,038,206 B2 * | 5/2006 | Chen et al. | 250/338.2 |
| 7,564,021 B2 * | 7/2009 | Mantese et al. | 250/214 R |
| 2002/0149434 A1 * | 10/2002 | Toncich et al. | 331/158 |
| 2006/0163482 A1 | 7/2006 | Mantese et al. | |
| 2006/0180759 A1 | 8/2006 | Mantese et al. | |
| 2006/0181479 A1 | 8/2006 | Mantese et al. | |

OTHER PUBLICATIONS

U.S. Appl. No. 11/682,974, filed Mar. 7, 2007, Title: Low-Fire Ferroelectric Material.
U.S. Appl. No. 11/671,662, filed Feb. 6, 2007, Title: Infrared Sensors and Methods for Manufacturing the Infrared Sensors.
U.S. Appl. No. 11/761,110, filed Jun. 11, 2007, Title: Systems and Methods for Determining a Temperature of a Ferroelectric Sensor.

* cited by examiner

*Primary Examiner*—Georgia Y Epps
*Assistant Examiner*—Pascal M Bui-Pho
(74) *Attorney, Agent, or Firm*—Thomas N. Twomey

(57) ABSTRACT

A system and a method for determining a change of temperature of a SBT pixel element are provided. The method includes determining a first value indicating an amount of surface charge of the SBT pixel element due to a spontaneous polarization of the SBT pixel element at a first time. The method further includes determining a second value indicating an amount of surface charge of the SBT pixel element due to a spontaneous polarization of the SBT pixel element at a second time. The method further includes determining a third value proportional to a difference between the first value and the second value. The method further includes determining a fourth value indicative of the change of temperature of the SBT pixel element based on the third value. The method further includes storing the fourth value indicative of the change of temperature of the SBT pixel element in a memory device.

19 Claims, 2 Drawing Sheets

SYSTEM AND METHOD FOR DETERMINING A CHANGE OF TEMPERATURE OF A SBT PIXEL ELEMENT

CROSS REFERENCE TO RELATED APPLICATION

The application claims the benefit of U.S. provisional application No. 60/851,691, filed Oct. 13, 2006, the contents of which are incorporated herein by reference.

BACKROUND

Ferroelectric pixel elements have been constructed from materials, other than strontium tantalate (SBT), to detect thermal radiation. However, these ferroelectric pixel elements have a Curie temperature relatively close to ambient room temperature. However, ambient temperature changes can sometimes undesirably cause a temperature of the ferroelectric pixel elements to be increased above the respective Curie temperature. As a result, in this situation, the ferroelectric pixel elements are unable to accurately monitor thermal radiation unless thermally stabilized by a thermo-cooling device.

The inventor herein has recognized a need for a system and a method for determining a change in temperature of a SBT pixel element that reduces and/or eliminates the above-mentioned deficiencies.

SUMMARY

A method for determining a change of temperature of a SBT pixel element in accordance with an exemplary embodiment is provided. The method includes determining a first value indicating an amount of surface charge of the SBT pixel element due to a spontaneous polarization of the SBT pixel element at a first time. The method further includes determining a second value indicating an amount of surface charge of the SBT pixel element due to a spontaneous polarization of the SBT pixel element at a second time. The method further includes determining a third value proportional to a difference between the first value and the second value. The method further includes determining a fourth value indicative of the change of temperature of the SBT pixel element based on the third value. The method further includes storing the fourth value indicative of the change of temperature of the SBT pixel element in a memory device.

A system for determining a change of temperature of a SBT pixel element in accordance with another exemplary embodiment is provided. The system includes a capacitor electrically coupled to the SBT pixel element. The system further includes a microprocessor electrically coupled to the capacitor. The microprocessor is configured to measure a voltage across the capacitor at a first time to obtain a first measured voltage value. The microprocessor is further configured to determine a first value indicating an amount of surface charge of the SBT pixel element due to a spontaneous polarization of the SBT pixel element, based on the first measured voltage value. The microprocessor is further configured to measure the voltage across the capacitor at a second time to obtain a second measured voltage value. The microprocessor is further configured to determine a second value indicating an amount of surface charge of the SBT pixel element due to a spontaneous polarization of the SBT pixel element, based on the second measured voltage value. The microprocessor is further configured to determine a third value proportional to a difference between the first value and the second value. The microprocessor is further configured to determine a fourth value indicative of the change of temperature of the SBT pixel element based on the third value. The microprocessor is further configured to store the fourth value indicative of the change of temperature of the SBT pixel element in a memory device.

DESCRIPTION OF EXEMPLARY EMBODIMENTS

Figure 1:
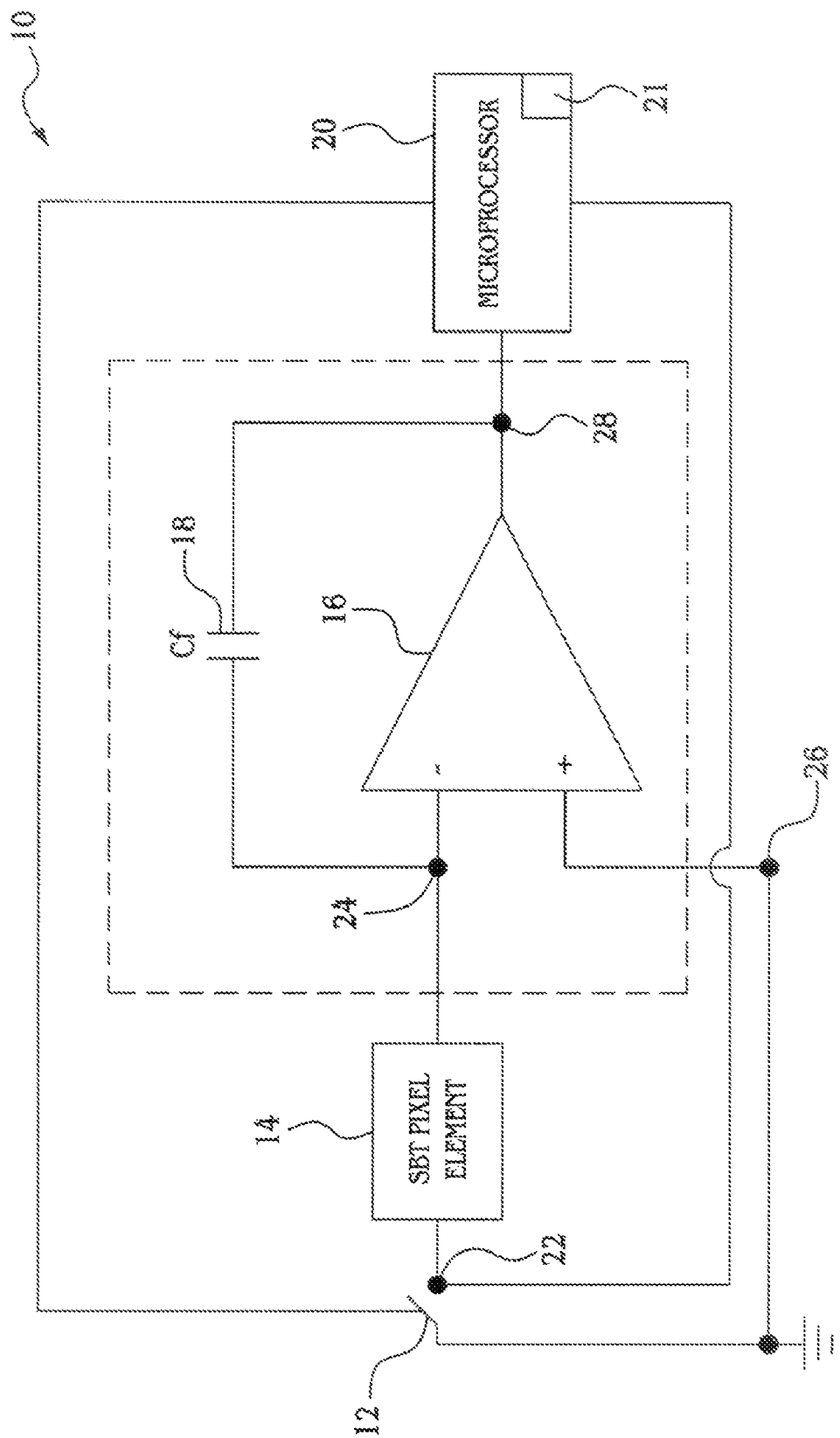
FIG. 1 is a schematic of a system for determining a change of temperature of a SBT pixel element.

Before explaining the system for determining a change of temperature of a SBT pixel element, the underlying physics of the system will be explained. The SBT pixel element is a ferroelectric sensing device. The term "ferroelectric" refers to a crystalline dielectric that can be given an electric polarization by application of an electric field. Focal plane arrays (FPA) can be developed that utilize a plurality of SBT pixel elements. For ease of understanding, however, the operation of a single SBT pixel element will be explained below.

The SBT pixel element can be operated in a pyroelectric mode. The pyroelectric mode of operation relies on the ability of the SBT pixel element to undergo a change in polarization with a change in temperature. Each SBT pixel element is thermally sensitive to a portion of the scene to be imaged. The SBT pixel element is thermally biased so that the added or diminished infrared energy from the imaged scene locally raises or lowers the temperature of the material pertaining to the SBT pixel element. A rotating chopper having a slit for allowing the energy from a scene to contact the SBT pixel element is used as a reference. The bias temperature is below the Curie temperature ($T_C$) of the material, which is the temperature below which the crystal structure changes from cubic to tetragonal and concomitantly from paraelectric to ferroelectric. Below the SBT pixel element's Curie temperature, a single crystal ferroelectric will spontaneously polarize, depositing charge on the surface of a capacitive element.

For an unstressed SBT pixel element, its polarization state is uniquely determined by its temperature. Thus, a measure of the polarization state determines the mean pixel temperature; hence a polarization map of each SBT pixel element of a FPA array translates into a temperature of a portion of an image scene projected upon the FPA array.

During operation, a portion of a scene's image is projected onto a SBT pixel element, causing a temperature differential, $\Delta T_p$, from that of the temperature reference set by the chopper. The magnitude of $\Delta T_p$, of course, depends upon such factors as the heat capacity of the SBT pixel element, what portion of black body radiation at a selected wavelength is absorbed by the SBT pixel element, the thermal conductance and radiation losses from the pixel to its surroundings, and the duration of exposure time as set by the chopper window. In practice, $\Delta T_p$ is often many times smaller than the difference between the scene temperature and the reference temperature, $\Delta T_s$, i.e, $\Delta T_p \approx \alpha \cdot \Delta T_s$ with $\alpha \ll 1$. For a wide range of consumer applications, a minimum detectability of $\Delta T_s \approx 0.03°$ C. is desirable.

The amount of charge that accumulates on the surface of each SBT pixel element is represented by the following equation:

$$\Delta Q = A \cdot \Delta P_s \quad (1)$$

wherein A is the area of the SBT pixel element and $\Delta P_s$ is the change in spontaneous polarization due to a temperature change, $\Delta T_p$. Equation (1) is often normalized to produce an intrinsic quantity, called the pyroelectric coefficient, p, which is represented by the following equation:

$$p = \Delta Q / A \cdot \Delta T_p = \Delta P_s / \Delta T_p \quad (2)$$

Pyroelectric coefficients as high as 10 $\mu C/cm^{2\circ}C$. can be obtained from single crystal SBT pixel element; however, bulk ceramic materials often display p values less than 0.1 $\mu C/cm^{2\circ}$ C. A thin film SBT pixel element has a significantly reduce pyroelectric coefficient, particularly when deposited on silicon, because its crystal structure favors an alignment of the electric dipoles in-plane in the presence of thermally induced tension. For example, p values for a SBT pixel element on silicon can be less than equal to about 0.005 $\mu C/cm^{2\circ}$ C., or more specifically, equal to about 0.001 $\mu C/cm^{2\circ}$ C.

The Equation (2) can be mathematically manipulated to obtain the following Equation (3) for determining the temperature change $\Delta T_p$ of the SBT pixel element:

$$\Delta T_p = p \cdot A / \Delta Qp \quad (3)$$

Referring to FIG. 1, a system 10 for determining a change of temperature of a SBT pixel element 14 is illustrated. The system 10 includes a switch 12, an operational amplifier 16, a capacitor 18, and a microprocessor 20.

The SBT pixel element 14 is provided to generate a signal indicative of a temperature of the SBT pixel element 14, which is also indicative of a temperature of a portion of a scene. The SBT pixel element 14 is contructed from strontium bismuth tantalate. The SBT pixel element 14 is electrically coupled between the switch 12 at a node 22 and an inverting terminal of the operational amplifier 16 at a node 24.

The operational amplifier 16 is provided to amplify a signal generated by the SBT pixel element 14. The inverting terminal of the amplifier 16 is electrically coupled to an output terminal of the SBT pixel element 14. The non-inverting terminal of the amplifier 16 is electrically coupled to the switch 12. An output terminal of the amplifier 16 is electrically coupled to the microprocessor 20 at a node 28. The capacitor 18 is electrically coupled between the node 24 and a node 28. The capacitor 18 is provided to store a charge generated by the SBT pixel element 14.

The microprocessor 20 is provided to determine a change in temperature of the SBT pixel element 14 based upon received signals at the node 28, as will be explain in further detail below. The microprocessor 20 is electrically coupled to an output terminal of the amplifier 16 and to the switch 12. The microprocessor 20 is configured to control an operational state of the switch 12 for resetting an operational state of the SBT pixel element.

Figure 2:
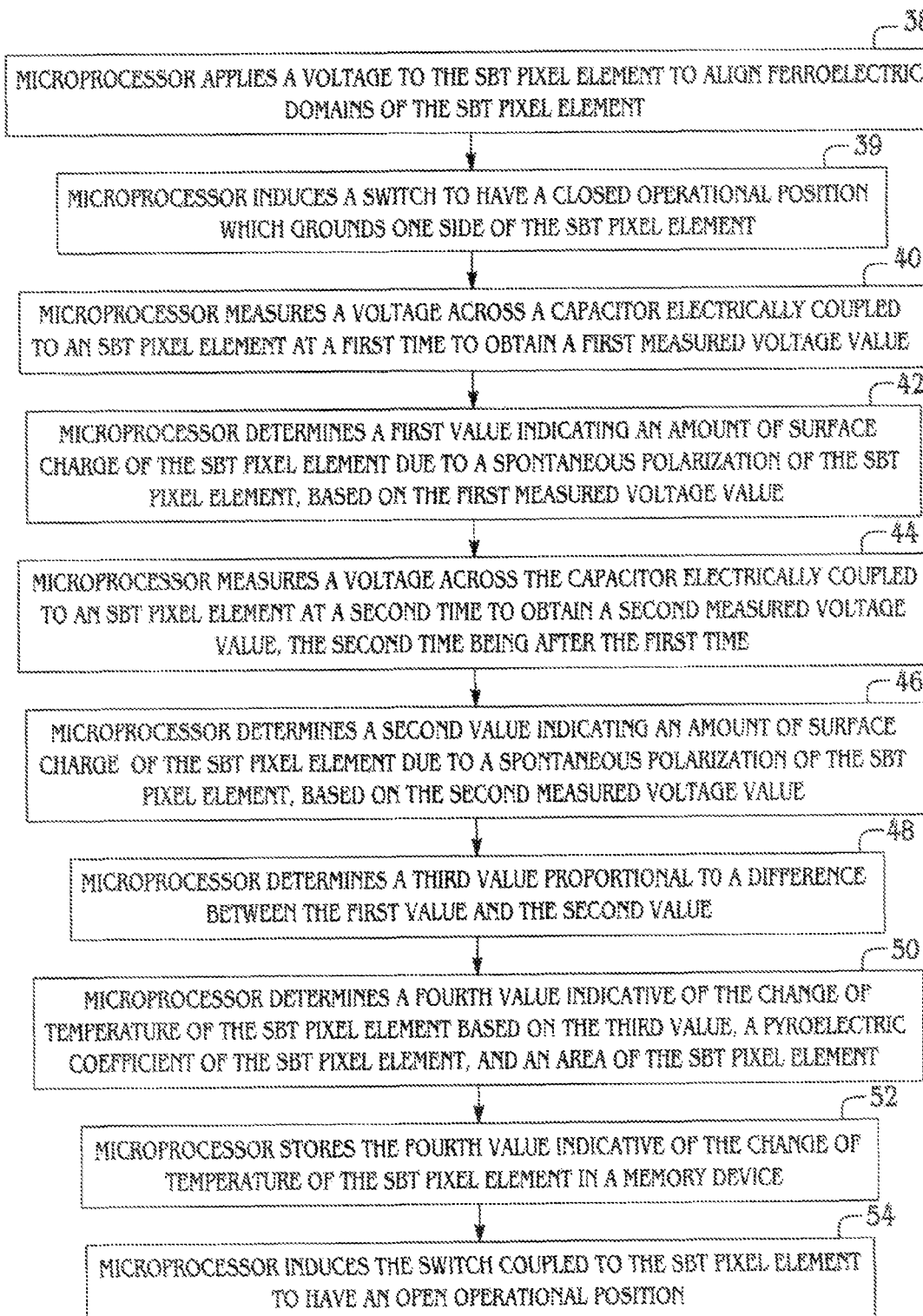
FIG. 2 is a flowchart of a method for determining a change of temperature of the SBT pixel element.

Referring to FIG. 2, a flowchart of a method for determining a change in temperature of the SBT pixel element 14, utilizing the system 10, will now be explained.

At step 38, the microprocessor 20 applies a voltage to the SBT pixel element 14 at the node 22 to align ferroelectric domains of the SBT pixel element 14.

At step 39, the microprocessor 20 induces the switch 12 to have a closed operational position which grounds one side of the SBT pixel element 14.

At step 40, the microprocessor 20 measures a voltage across the capacitor 18 electrically coupled to the SBT pixel element 14 at a first time to obtain a first measured voltage value.

At step 42, the microprocessor 20 determines a first value (Q1) indicating an amount of surface charge of the SBT pixel element 14 due to a spontaneous polarization of the SBT pixel element 14, based on the first measured voltage value.

At step 44, the microprocessor 20 measures a voltage across the capacitor 18 electrically coupled to the SBT pixel element 14 at a second time to obtain a second measured voltage value. The second time is after the first time.

At step 46, the microprocessor 20 determines a second value (Q2) indicating an amount of surface charge of the SBT pixel element 14 due to a spontaneous polarization of the SBT pixel element 14, based on the second measured voltage value.

At step 48, the microprocessor 20 determines a third value ($\Delta Q1$) proportional to a difference between the first value (Q1) and the second value (Q2). For example, the third value can be determined based upon the following equation: $\Delta Q1 = y^*(Q2-Q1)$ wherein y is a predetermined value.

At step 50, the microprocessor 20 determines a fourth value ($\Delta T1$) indicative of the change of temperature of the SBT pixel element 14 based on the third value ($\Delta Q1$), a pyroelectric coefficient (p) of the SBT pixel element 14, and an area (A) of the SBT pixel element 14. In one exemplary embodiment, the fourth value ($\Delta T1$) is calculated utilizing the following equation: $\Delta T1 = p \cdot A / \Delta Q1$ At step 52, the microprocessor 20 stores the fourth value ($\Delta T1$) indicative of the change of temperature of the SBT pixel element 14 in a memory device 21.

At step 54, the microprocessor 20 induces the switch 12 to have an open operational position. After step 54, the method returns to step 38.

The system and the method for determining a change of temperature of the SBT pixel element represents a substantial advantage over other systems and methods. In particular, the system and method can determine a change of temperature of the SBT pixel element without requiring a thermal-cooling device to maintain the SBT pixel element at a temperature below ambient room temperature.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for determining a change of temperature of a SBT pixel element, comprising:

determining a first value indicating an amount of surface charge of the SBT pixel element due to a spontaneous polarization of the SBT pixel element at a first time;

determining a second value indicating an amount of surface charge of the SBT pixel element due to a spontaneous polarization of the SBT pixel element at a second time;

determining a third value proportional to a difference between the first value and the second value;

determining a fourth value indicative of the change of temperature of the SBT pixel element based on the third value; and storing the fourth value indicative of the change of temperature of the SBT pixel element in a memory device, wherein the steps of determining the first and second value further include the first value being in relation to a first measured voltage value across a capacitor, said capacitor being in series electrical connection to the SBT pixel element, and the second value being in relation to a second measured voltage value across the capacitor.

2. The method of claim 1, wherein the fourth value is further based on a pyroelectric coefficient of the SBT pixel element and an area of the SBT pixel element.

3. The method of claim 1, wherein the steps of determining a first and second value further include an initial voltage value being applied to the SBT pixel element to align ferroelectric domains of the SBT pixel element, said initial voltage value being applied to the SBT pixel element prior to determining the first and second value.

4. The method of claim 3, further including the step of electrically grounding one side of the SBT pixel element after applying the initial voltage value and before determining the first and second value.

5. The method of claim 4, wherein the step of electrically grounding one side of the SBT pixel element comprises using a switch, said switch having a first side being in electrical connection to a ground voltage reference and a second side being in electrical connection to the one side of the SBT pixel element, and said switch being in a closed position, whereby the one side of the SBT pixel element is in electrical connection to the ground voltage reference through the switch, and the switch being operatively controlled to the closed position by a microprocessor.

6. The method of claim 3, further including the step of electrically ungrounding one side of the SBT pixel element before applying the initial voltage value.

7. The method of claim 6, wherein the step of electrically ungrounding the one side of the SBT pixel element comprises using a switch, said switch having a first side being in electrical connection to a ground voltage reference and a second side being in electrical connection to the one side of the SBT pixel element, and said switch being in an open position, whereby the SBT pixel element is disconnected from being in electrical connection to the ground voltage reference, and the switch being operatively controlled to the open position by a microprocessor.

8. The method of claim 3, wherein the steps of determining the first and second and third and forth value and storing the forth value further including utilizing an operational amplifier circuit, comprising:
 an operational amplifier including a first input and a second input and an output, said second input being in electrical connection to a voltage reference;
 the SBT pixel element including a first element side and a second element side, said first element side being in connection to the first input of the operational amplifier;
 a capacitor being in electrical connection to the first input and the output of the operational amplifier, whereby said capacitor is in feedback loop configuration of the operational amplifier;
 a switch including a first switch side and a second switch side, said first switch side being in electrical connection to the second element side of the SBT pixel element and the second switch side being in connection to a ground voltage reference; and
 a microprocessor in electrical connection to the output of the operational amplifier, and the microprocessor including a first and second microprocessor output, said first microprocessor output being in electrical connection to the second element side of the SBT pixel element adapted for applying the initial voltage value to the SBT pixel element and said second microprocessor output being in electrical connection to the switch for operational control of the switch.

9. The method of claim 8, wherein steps of determining the first and second and third and forth value and storing the forth value further include the first input of the operational amplifier being an inverting input, and the second input of the operational amplifier being a noninverting input, said noninverting input being in electrical connection to the ground voltage reference.

10. The method of claim 3, wherein the steps of determining the first and second and third and forth value and storing the forth value are determined by a microprocessor and the initial voltage value is applied to the SBT pixel element by the microprocessor.

11. The method of claim 1, wherein the steps of determining the first and second value further include the second time being at a point in time later than the first time.

12. A system for determining a change of temperature of a SBT pixel element, comprising:
 a capacitor electrically coupled to the SBT pixel element;
 a microprocessor electrically coupled to the capacitor, the microprocessor configured to measure a voltage across the capacitor at a first time to obtain a first measured voltage value;
 the microprocessor further configured to determine a first value indicating an amount of surface charge of the SBT pixel element due to a spontaneous polarization of the SBT pixel element, based on the first measured voltage value;
 the microprocessor further configured to measure the voltage across the capacitor at a second time to obtain a second measured voltage value;
 the microprocessor further configured to determine a second value indicating an amount of surface charge of the SBT pixel element due to a spontaneous polarization of the SBT pixel element, based on the second measured voltage value;
 the microprocessor further configured to determine a third value proportional to a difference between the first value and the second value;
 the microprocessor further configured to determine a fourth value indicative of the change of temperature of the SBT pixel element based on the third value; and
 the microprocessor further configured to store the fourth value indicative of the change of temperature of the SBT pixel element in a memory device.

13. The system of claim 12, wherein the fourth value is further based on a pyroelectric coefficient of the SBT pixel element and an area of the SBT pixel element.

14. The system of claim 12, wherein an initial voltage value is applied to the SBT pixel element to align ferroelectric domains of the SBT pixel element, said initial voltage value being applied to the SBT pixel element prior to determining the first and second value, and the second time occurs at a point in time later than the first time.

15. The system of claim 14, further comprising a switch to provide electrical connection from one side of the SBT pixel element to a ground voltage reference after applying the initial voltage value and before determining the first and second value.

16. The system of claim 15, wherein said switch has a first side being in electrical connection to the ground voltage reference and a second side being in electrical connection to the one side of the SBT pixel element, and said switch being in a closed position, whereby the one side of the SBT pixel element is in electrical connection to the ground voltage reference through the switch, and the switch being operatively controlled to the closed position by the microprocessor.

17. The system of claim 14, further comprising a switch to electrically unground one side of the SBT pixel element before applying the initial voltage value.

18. The system of claim 17, wherein said switch has a first side being in electrical connection to a ground voltage reference and a second side being in electrical connection to the one side of the SBT pixel element, and said switch being in an open position, whereby the SBT pixel element is disconnected from being in electrical connection to the ground voltage reference, and the switch being operatively controlled to the open position by the microprocessor.

19. The system of claim 14, wherein the SBT pixel element is disposed in an operational amplifier circuit, comprising:
   an operational amplifier including a first input and a second input and an output, and the first input of the operational amplifier being an inverting input, and the second input of the operational amplifier being a noninverting input, said noninverting input being in electrical connection to a voltage reference;
   the SBT pixel element including a first element side and a second element side, said first element side being in connection to the first input of the operational amplifier;
   the capacitor being in electrical connection to the first input and the output of the operational amplifier, whereby said capacitor is in feedback loop configuration of the operational amplifier;
   a switch including a first switch side and a second switch side, said first switch side being in electrical connection to the second element side of the SBT pixel element and the second switch side being in connection to a ground voltage reference; and
   the microprocessor in electrical connection to the output of the operational amplifier, and the microprocessor including a first and second microprocessor output, said first microprocessor output being in electrical connection to the second element side of the SBT pixel element adapted for applying the initial voltage value to the SBT pixel element and said second microprocessor output being in electrical connection to the switch for operational control of the switch.

* * * * *